United States Patent [19]
Check et al.

[11] 3,729,609
[45] Apr. 24, 1973

[54] MULTI-ELECTRODE ELECTRICAL DISCHARGE MACHINING APPARATUS

[75] Inventors: John M. Check, Chelsea; Gary F. Rupert, Ann Arbor, both of Mich.

[73] Assignee: Raycon Corporation, Ann Arbor, Mich.

[22] Filed: Feb. 8, 1971

[21] Appl. No.: 113,410

[52] U.S. Cl. ................. 219/69 G, 219/139, 314/5
[51] Int. Cl. ................................................. B23p 1/08
[58] Field of Search ............... 219/69 E, 69 R, 69 V, 219/139, 234; 314/5

[56] References Cited

UNITED STATES PATENTS

| | | | |
|---|---|---|---|
| 2,504,338 | 4/1950 | MacLatchie | 219/234 UX |
| 3,125,700 | 3/1964 | 314 | 69/ |
| 3,604,883 | 9/1971 | Dietz | 219/69 E |

*Primary Examiner*—R. F. Staubly
*Attorney*—Olsen & Stephenson

[57] ABSTRACT

Electrical discharge machining apparatus comprising a frame, a plurality of substantially parallel electrodes, a carriage mounted on the frame for guided movement in a vertical direction, and a cartridge assembly supporting the electrodes and removably mounted on the carriage so that the electrodes extend vertically. Manually operable gripper means is provided for feeding the electrodes downwardly after each machining operation into engagement with the workpiece so as to compensate for electrode wear experienced during one or more preceding machining operations. Positive stop anti-short power means is combined with the carriage to enable retraction of the electrodes out of engagement with the workpiece into a predetermined spaced relation with the workpiece at least as great as the desired spark gap spacing between the electrodes and the workpiece during machining. The cartridge assembly includes a cartridge member provided with contact blocks connected to a supply of current and engaged with the electrodes during machining.

11 Claims, 11 Drawing Figures

Patented April 24, 1973  3,729,609

INVENTORS
JOHN M. CHECK
GARY F. RUPERT
BY
OLSEN & STEPHENSON
ATTORNEYS

Patented April 24, 1973

INVENTORS
JOHN M. CHECK
GARY F. RUPERT

BY

OLSEN & STEPHENSON

ATTORNEYS

Patented April 24, 1973
3,729,609
4 Sheets-Sheet 4
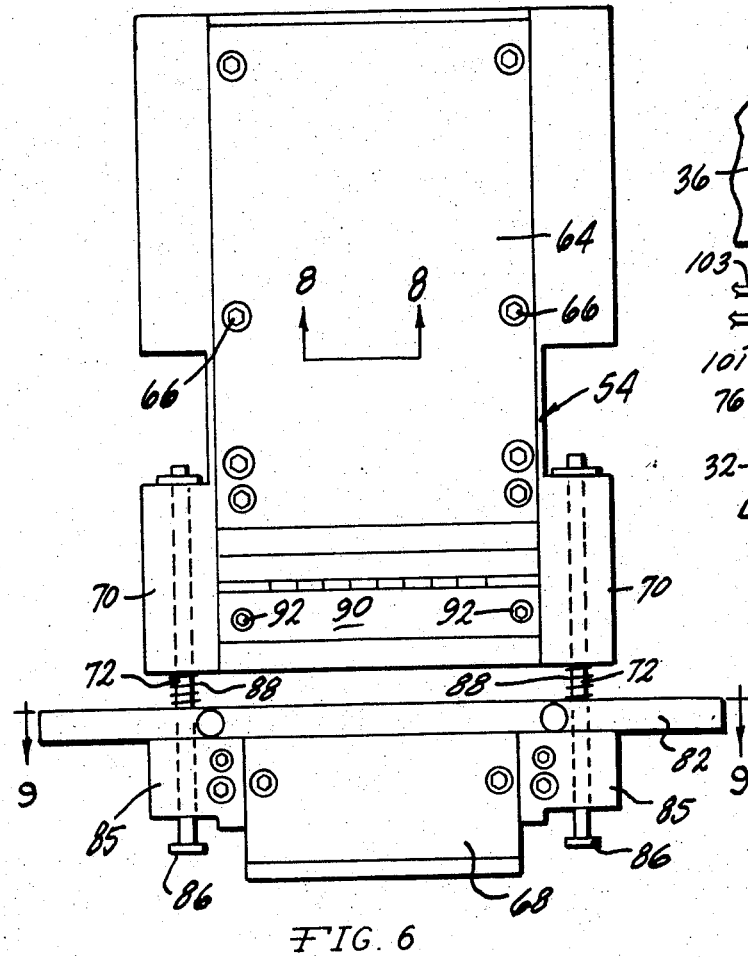
FIG. 6
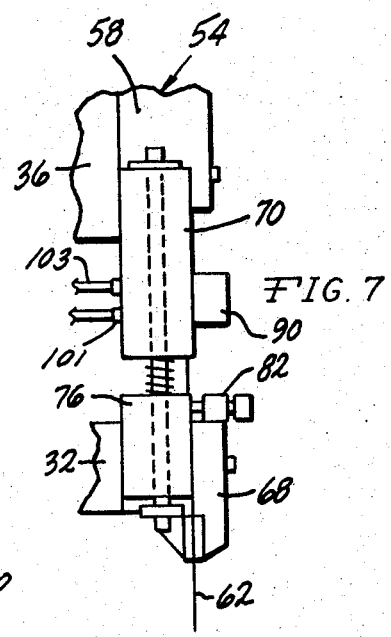
FIG. 7
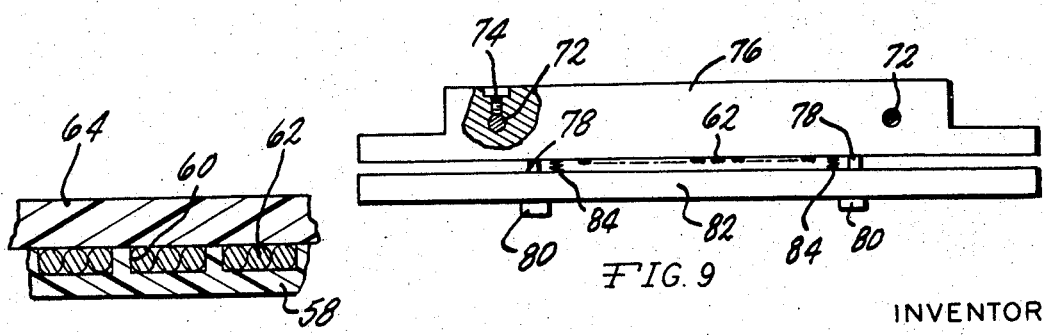
FIG. 8
FIG. 9
INVENTORS
JOHN M. CHECK
GARY F. RUPERT
BY
OLSEN & STEPHENSON
ATTORNEYS

MULTI-ELECTRODE ELECTRICAL DISCHARGE MACHINING APPARATUS

BACKGROUND OF THE INVENTION

The simultaneous forming of a plurality of openings in a workpiece is often desirable. Many times, these openings must be of very small size and must be closely spaced. Previously available apparatus for accomplishing hole forming operations of this type have been unsatisfactory for a variety of reasons. The principal object of the present invention, therefore, is to provide a semi-automatic electrical discharge machining structure capable of simultaneously forming a large number of small holes of any desired shape in a workpiece and capable of reducing machine set-up time to thereby impart a high degree of efficiency to the entire machining operation.

SUMMARY OF THE INVENTION

The electrical discharge machining apparatus of this invention consists of a frame, a plurality of substantially parallel electrodes corresponding in cross sectional shape to the desired shape of the holes to be formed, a carriage mounted on the frame for guided vertical movement in the illustrated embodiment of the invention and a pre-assembled cartridge assembly supporting the electrodes and removably mounted on the carriage so that the electrodes extend vertically. It is to be understood that while the carriage moves vertically in the illustrated embodiment of the invention, it is within the purview of this invention to arrange the carriage for translatory movement in any desired direction. The cartridge assembly includes guide for the electrodes and a cartridge member to which the electrodes are clamped during machining. In between machining operations, the clamp is released and a gripper mechanism which forms part of the cartridge assembly is employed to feed the electrodes downwardly into engagement with the workpiece so as to compensate for erosion of the electrodes which took place during one or more preceding machining operations. The electrodes are re-clamped to the cartridge member following re-feeding of the electrodes. During machining the cartridge assembly moves with the carriage so that downward movement of the carriage will be effective to move the electrodes into the workpiece. Prior to start of the machining operation, a cylinder assembly associated with the carriage and the carriage feeding motor is actuated to move the carriage in a direction away from the workpiece to a positive stop position in which the electrodes are spaced from the workpiece a distance at least equal to but usually greater than the spark gap distance required between the workpiece and the electrodes during machining. A conventional servo control mechanism is utilized during downward machining movement of the electrodes to maintain the spark gap distance. To enable the efficient conduction of current to the electrodes, current conducting contact blocks are provided in the cartridge member and the electrodes are securely clamped against the contact blocks singly or in groups, the contact blocks being integrally formed with power lead receiving portions. The apparatus can then be operated continuously until the electrodes have been eroded away to the point where they are of insufficient length. At such time the cartridge assembly with the worn electrodes is removed from the carriage and replaced with a similar pre-assembled cartridge assembly having new electrodes mounted thereon so that a minimum of delay is encountered during use of the machine due to electrode wear. The apparatus of this invention thus provides an electrode discharge machining structure capable of forming large numbers of small openings quickly and at reduced cost by virtue of the fact that the cartridge assembly can be set up away from the machine and installed on the machine in condition for immediate use.

Further objects, features and advantages of this invention will become apparent from a consideration of the following description, the appended claims, and the accompanying drawing in which:

FIG. 6 is a front elevational view of the cartridge assembly in the apparatus of this invention;

FIG. 7 is a fragmentary side elevational view of the cartridge assembly in the apparatus of this invention, in position mounted on the carriage and the apparatus frame;

FIG. 8 is an enlarged fragmentary sectional view of a portion of the cartridge assembly in the apparatus of this invention as seen from the line 8—8 in FIG. 6;

FIG. 9 is a transverse sectional view of the electrode gripper portion of the cartridge assembly of this invention as seen from substantially the line 9—9 in FIG. 6;

Figures 1, 4:
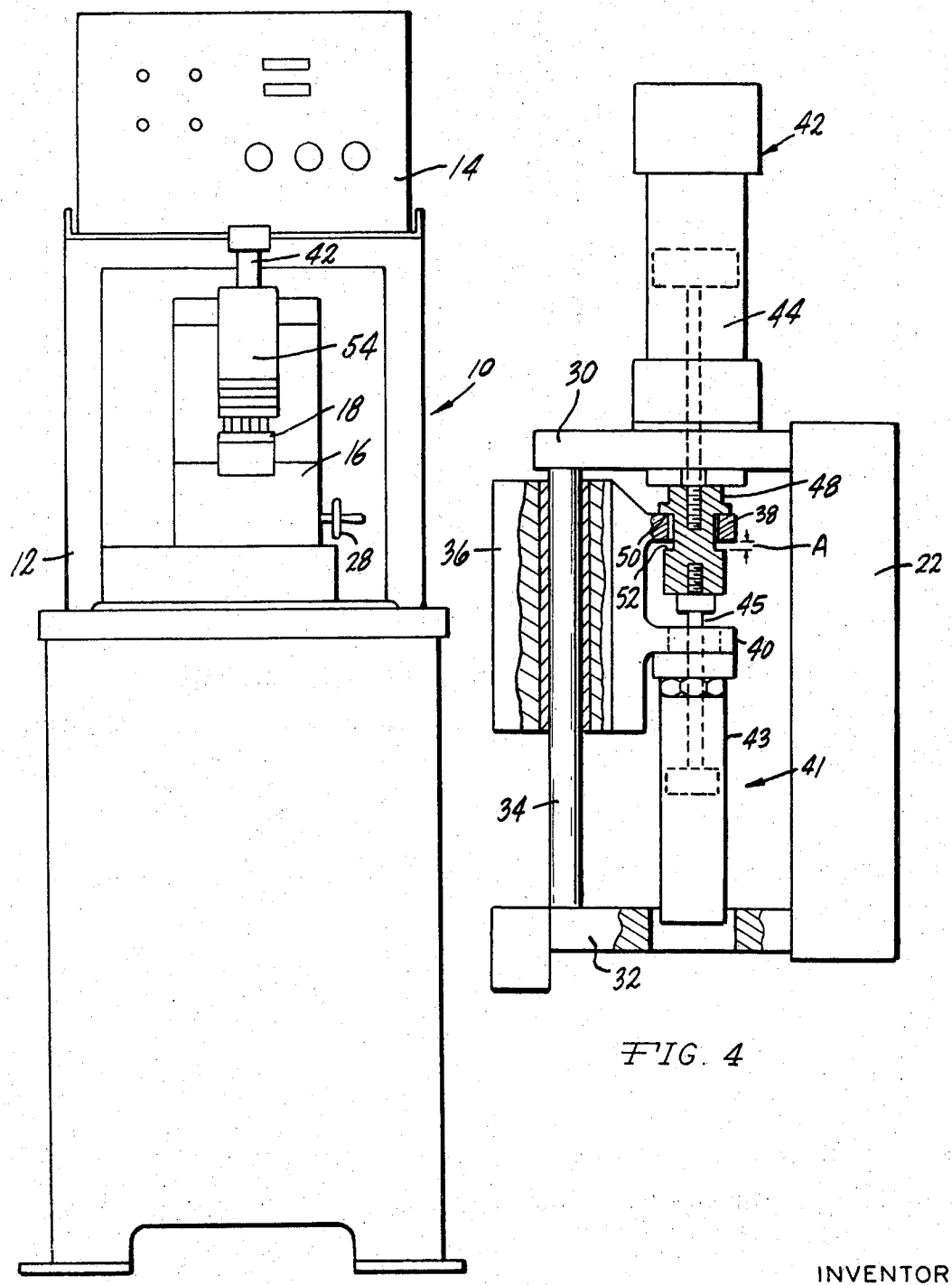
FIG. 1 is a front view of the apparatus of this invention.
FIG. 4 is an enlarged side view of the carriage moving portion of the apparatus of this invention showing the carriage in the position occupied during machining.
Figure 2:
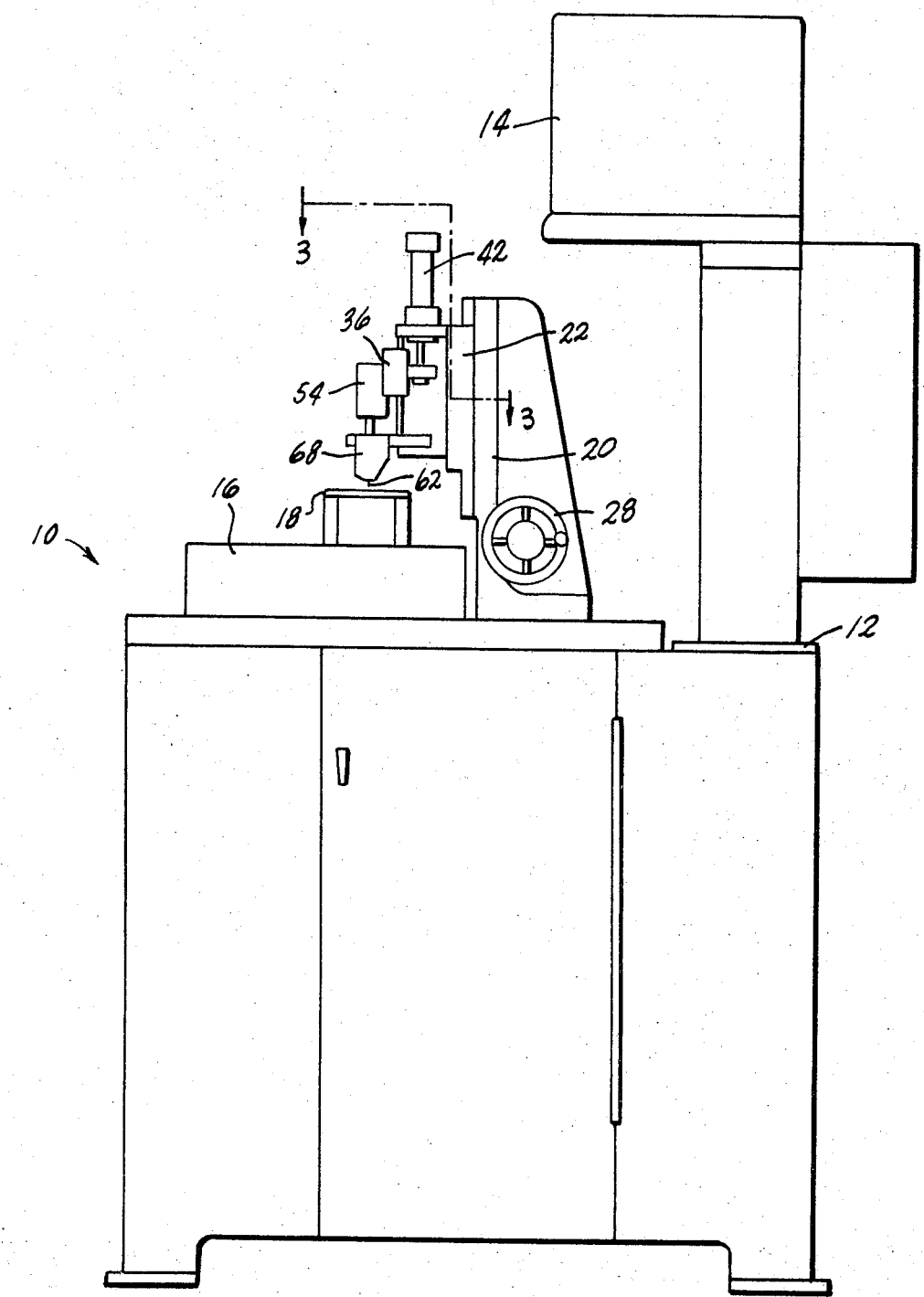
FIG. 2 is a side view of the apparatus of this invention.
Figure 3:
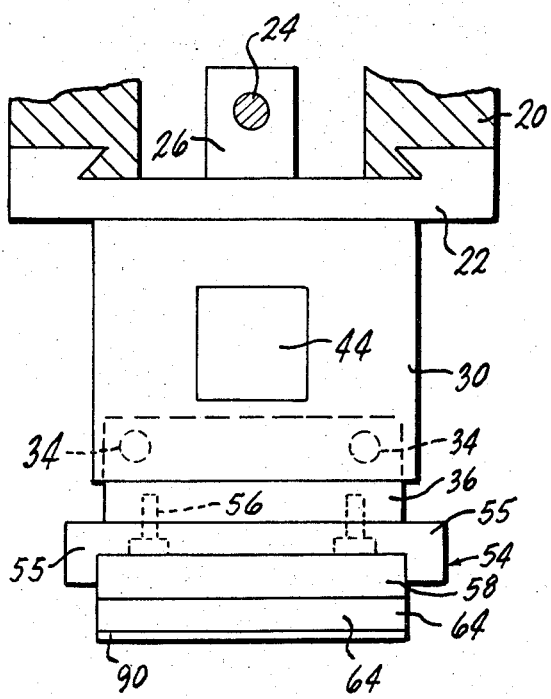
FIG. 3 is an enlarged horizontal sectional view of the apparatus of this invention as seen from substantially the line 3—3 in FIG. 2.

With reference to the drawing, the electrical discharge machining apparatus of this invention, indicated generally at 10, is illustrated in FIGS. 1 and 2 as including a main frame 12 on which a control panel 14 is mounted containing the usual power generator and controls for the machine which form no part of the present invention and are therefore not disclosed in detail. A support 16 for a workpiece 18 is also mounted on the main frame 12. The main frame 12 has an upright portion 20 on which a frame member 22 is guidably supported. An upright screw 24 (FIG. 3) which is threadably mounted in a nut portion 26 formed integral with the frame 22 is rotatable in response to rotation of a hand crank 28 (FIG. 2) to adjust the vertical position of the frame 22 for a purpose to appear presently.

Figure 5:
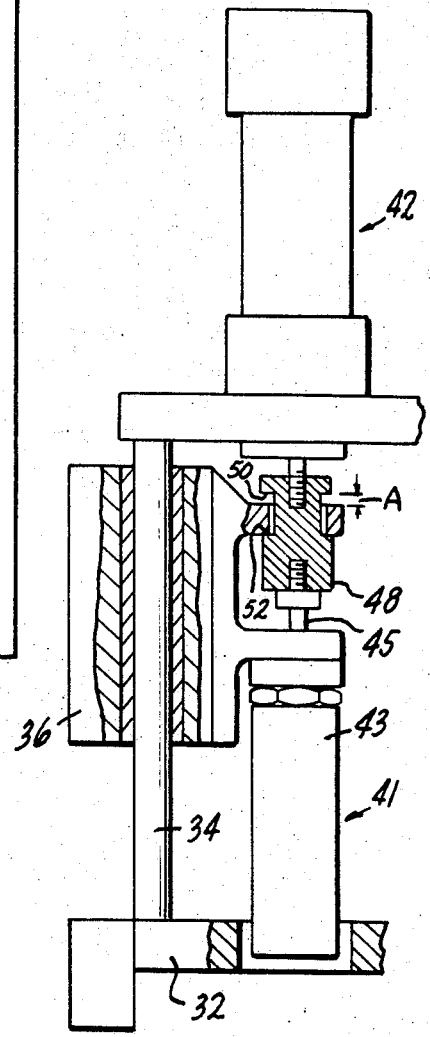
FIG. 5 is a side elevational view of the portion of the machine of this invention shown in FIG. 4 illustrating the carriage in position immediately following manual refeeding of the electrodes.

As shown in FIGS. 4 and 5, the frame 22 is provided with a pair of vertically spaced forwardly extending portions 30 and 32 and guide rods 34 are supported on and extend between the portions 30 and 32. A carriage 36, slidably supported on the guide rods 34, is provided with rearwardly extended projections 38 and 40. A fluid actuated servo cylinder assembly 42 includes a cylinder 44 which is mounted on the frame portion 30 and a downwardly extending piston rod 45 which is secured at its lower end to a stop body 48 provided with vertically spaced abutment surfaces 50 and 52. The surfaces 50 and 52 are spaced apart a distance greater than the vertical dimension of the carriage projection 38 by an amount, indicated at A, which is carefully preselected. The distance A is at least equal to but is usually greater than the usual spark gap distance that is maintained between the electrodes and the work during machining.

A cylinder assembly 41 has its cylinder 43 secured to the carriage projection 40 and has its piston rod 45 secured to the block 48. The cylinder assembly 41 functions to prevent electrical shorting between the electrodes and the work at the start of a machining cycle and is therefore sometimes referred to herein as the anti-short cylinder assembly.

A cartridge assembly 54 (FIGS. 6 and 7), which is pre-assembled before mounting in the apparatus 10, is removably mounted on the carriage 36. The cartridge assembly 54 includes a supporting body 55 which is mounted on the carriage 36 by means of bolts 56 (FIG. 3) and a cartridge member 58 which is mounted on the body 55. The cartridge member 58 is formed with vertically extending channels 60 (FIG. 8) each of which is of a size to slidably support a plurality of vertically extending electrodes 62 in the illustrated embodiment of the invention. It is to be understood, however, that each channel 60 can be of a size to accommodate a single electrode 62. The cartridge member 58 is formed of an electrically non-conducting material and a retainer plate 64, formed of a similar material, is mounted by means of bolts 66 on the forward face of the cartridge member 58 so as to retain the electrodes 62 in the channels 60. The cartridge assembly 54 also includes an electrode guide portion 68 which is secured to the frame extension 32 in guiding relation with the electrodes 62 at a position below the cartridge member 58 and adjacent the work 18.

Transversely extending projections 70 on the body 55 slidably support a pair of upright pins 72 which are secured by set screws 74, only one of which is shown, to a gripper block 76 disposed below the cartridge member 58 and above the electrode guide 68. As shown in FIG. 9, the gripper block 76 carries a pair of forwardly projecting pins 78 provided at their outer ends with heads 80. A gripper member 82 is slidably supported on the pins 78 and is urged outwardly against the heads 80 by compression springs 84. The electrodes 62 extend between the gripper block 76 and the gripper member 82 and can be frictionally clamped therebetween by manually moving the gripper member 82 against the pressure of the springs 84 toward the gripper block 76 into engagement with the electrodes 62. To improve the frictional engagement of the gripper member 82 with the electrodes 62 a material (not shown) having high coefficient of friction characteristics can be applied to the surface of the member 82 which is adjacent the electrodes 62.

The slide pins 72 (FIG. 6) are also slidably mounted in projections 85 formed on the electrode guide 68. The slide pins extend downwardly below the projections 85 and are provided with stop washers 86. Springs 88 extend between the projections 70 and the gripper block 76 so as to normally maintain the gripper block 76 in a lower position engaged with the electrode guide assembly 68. To feed the electrodes 62 downwardly in the cartridge assembly 54, the gripper block 76 and the gripper member 82 are manually moved upwardly against the pressure of the springs 88 to stop positions in which the washers 86 engage the projections 85. The gripper member 82 is then manually moved toward the gripper block 76 so as to clamp the electrodes 62 therebetween, following which the block 76 and member 82 are manually moved downwardly so as to pull the electrodes 62 downwardly into positions in which the lower ends thereof conform to and engage the workpiece 18 when holes are to be formed therein. This manual pulling procedure may be repeated several times in order to insure movement of all of the electrodes 62 into engagement with the workpiece 18. When this has been accomplished, a clamp bar 90 (FIGS. 6 and 7) is moved into clamping engagement with the electrodes 62 by tightening screws 92 which mount the bar 90 on the cartridge member 58 at a position below the retainer plate 64.

Figure 10:
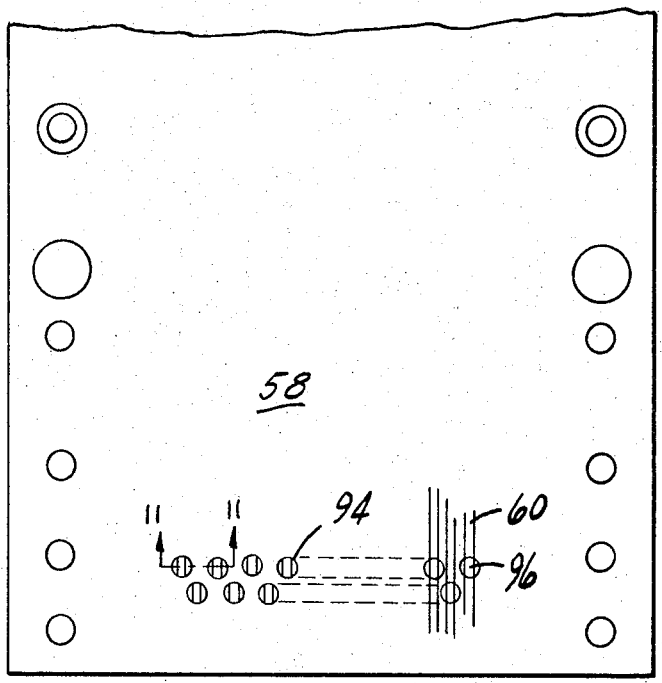
FIG. 10 is a fragmentary elevational view of a portion of the cartridge member in the apparatus of this invention.
Figure 11:
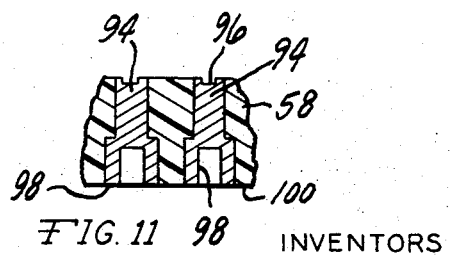
FIG. 11 is an enlarged fragmentary sectional view of a portion of the cartridge member as seen from substantially the line 11—11 in FIG. 10.

As shown in FIGS. 10 and 11, a plurality of contact blocks 94 are mounted in the cartridge member 58 at positions aligned with the clamp bar 90. The contact blocks 94 conduct current to the electrodes 62 which are firmly clamped against the blocks 94 by the bar 90. The clamp bar 90 is preferably formed of metal for rigidity purposes and has an insulating layer of a yieldable material, such as rubber, on the inner side thereof which accommodates electrodes of non-uniform size during clamping. Each contact block 94 has a grooved head 96 which aligned with a channel 60 in the cartridge member 58 and a tubular extension 98 which extends through the rear side 100 of the cartridge member 58. The tubular extension 98 is shaped to receive a jack 101 (FIG. 7) connected to a current conducting power lead 103 capable of supplying current to the contact block 94.

In the operation of the apparatus 10, assume that the carriage 36 is in an upper position on the slide rods 34 as shown in FIG. 4. Further assume that the clamp bar 90 has been loosened and that all of the electrodes 62 have been manually moved downwardly by manipulation of the grippers 76 and 82 into positions in which the lower ends thereof are in physical engagement with the surface of the workpiece 18. The clamp bar 90 is then tightened against the electrodes 62 by tightening the screws 92. The cylinder assembly 41 is then actuated so as to retract the piston rod 45 which results in an upward movement of the carriage 36 from the position shown in FIG. 5 to a position in which the projection 38 engages the abutment surface 50 (FIG. 4). This results in a retraction of the electrodes 62 away from the workpiece 18 a distance A which is at least equal to but is usually set to be greater than the spark gap distance required between electrodes and workpiece during machining to allow for the necessary servo action of cylinder assembly 42 during machining. It is important to note that in the apparatus 10, the significant anti-short feature is the movement of the carriage 36 a preselected distance against a positive stop. It is within the purview of this invention to accomplish this with a variety of structures other than the specific structure that is illustrated. The cylinder assembly 42 is then servo controlled so as to move the electrodes 62 downwardly into the workpiece 18 concurrently with a supply of current to the contact blocks 96 so that the electrodes 62 function continuously to spark erode the desired openings in the workpiece 18.

When the hole forming operation has been completed, the servo action of cylinder assembly 42 is terminated and the assembly 42 is reverse operated to retract the carriage 36. The workpiece 18 is replaced and the cylinder assembly 41 is actuated to return the carriage 36 to a position in which the projection 38 engages the abutment surface 52 as shown in FIG. 5. The above described cycle can then be repeated to form similar holes in the new workpiece. The extent of erosion of the electrodes 62 during each cycle is observed to determine whether it is necessary to operate the grippers 76 and 82 after each cycle or after several cycles. It is to be importantly noted that while the gripper block 76 and the gripper member 82 are shown as being manually operated in the illustrated embodiment of the invention, the operation of these components to effect refeed of the electrodes 62 is essentially a repeat mechanical motion which is readily mechanized and made automatic. Thus it is within the purview of this invention to provide for automatic, rather than manual, gripping and feeding of the electrodes in the apparatus 10.

What is claimed is:

1. In electrical discharge machining apparatus;
   a. a frame,
   b. a plurality of substantially parallel electrodes,
   c. a carriage mounted on said frame for guided translatory movement in one direction,
   d. a cartridge assembly supporting said electrodes and removably mounted on said carriage so that said electrodes extend longitudinally in said one direction,
   e. motor means mounted on said frame and connected to said carriage for moving said carriage back and forth in said one direction, and
   f. power means connected to said motor means and operable to move said carriage a predetermined distance in response to each actuation of said power means.

2. Electrical discharge machining apparatus according to claim 1 wherein said motor means comprises a fluid actuated cylinder assembly having the cylinder therefor mounted on said frame and having the piston rod therefor extending in said one direction, and wherein said power means comprises a fluid actuated cylinder assembly having the cylinder therefor mounted on said carriage and having the piston rod therefor extending in said one direction, means connecting said piston rods and providing a pair of abutment surfaces spaced apart in said one direction, and projection means on said carriage disposed between said surfaces.

3. Electrical discharge machining apparatus according to claim 2 wherein said surfaces are spaced apart a predetermined distance and said carriage projection is of a dimension in said one direction less than said predetermined distance by an amount at least as great as the spark gap spacing desired between said electrodes and a workpiece when electrical discharge machining of the workpiece is initiated.

4. In electrical discharge machining apparatus:
   a. a frame,
   b. a plurality of substantially parallel electrodes,
   c. a carriage mounted on said frame for guided translatory movement in one direction,
   d. a cartridge assembly supporting said electrodes and removably mounted on said carriage so that said electrodes extend longitudinally in said one direction, and wherein said cartridge assembly includes a cartridge member removably mounted on said carriage and having said electrodes slidably mounted thereon, an electrode retainer plate secured to said cartridge member so as to maintain said electrodes thereon, and electrode gripper means disposed at one end of said cartridge member and operable to grip said electrodes and manually move said electrodes in said one direction.

5. Electrical discharge machining apparatus according to claim 4 wherein said cartridge assembly further includes electrode guide means mounted on said frame at a position spaced from said carriage and said cartridge member and operable to guide said electrodes during movement of said carriage.

6. Electrical discharge machining apparatus according to claim 5 wherein said gripper means is disposed between said cartridge member and said guide means, said gripper means comprising a body engaged with said electrodes and guidably mounted for back and forth movement in said one direction, and a gripper bar mounted on said body for movement toward said body so as to grip the electrodes engaged therewith.

7. Electrical discharge machining apparatus according to claim 6 further including slide pin means guidably supported on said cartridge member and secured to said gripper body for guidably supporting said body during movement thereof, and stop means limiting the extent of movement of said slide pin means.

8. Electrical discharge machining apparatus according to claim 4 further including an electrode clamp bar releasably mounted on said cartridge member at a position between said retainer plate and said gripper means, said clamp bar being operable to clamp said electrodes against said cartridge member so as to maintain said electrodes in fixed positions relative to said cartridge member.

9. In electrical discharge machining apparatus:
   a. a frame,
   b. a plurality of substantially parallel electrodes,
   c. a carriage mounted on said frame for guided translatory movement in one direction,
   d. a cartridge assembly supporting said electrodes and removably mounted on said carriage so that said electrodes extend longitudinally in said one direction, and wherein said cartridge assembly includes a cartridge member formed of an electrically non-conducting material and having a plurality of channels formed therein substantially parallel to said one direction, each of said channels having at least one of said electrodes disposed therein, and retainer means secured to said cartridge member so as to retain said electrodes in said channels for movement longitudinally thereof, and e. a plurality of electrode contact blocks, each of said blocks being formed of an electric current conducting material and projecting into one of said channels and into current conducting engagement with the electrodes in cooperation with said retainer means.

10. Electrical discharge machining apparatus according to claim 9 wherein each of said blocks has an extension which extends through said cartridge member and is adapted to receive a current conductor lead.

11. Electrical discharge machining apparatus according to claim 9 wherein said contact blocks are spaced from said retainer plate and further including a clamp bar releasably secured to said cartridge member at a position aligned with said contact blocks and operable to clamp said electrodes against said blocks.

* * * * *